United States Patent [19]

Coughlan et al.

[11] 4,454,266

[45] Jun. 12, 1984

[54] RELEASE COATING COMPOSITIONS

[75] Inventors: Raymond T. Coughlan, Darien; Suzette M. Bojarski, Tinley Park, both of Ill.

[73] Assignee: Daubert Coated Products Inc., Chicago, Ill.

[21] Appl. No.: 483,765

[22] Filed: Apr. 11, 1983

[51] Int. Cl.$^3$ .......................... B29H 21/04; C08L 1/28
[52] U.S. Cl. ......................................... 524/44; 524/37; 524/42; 524/43; 264/130; 264/300; 264/304; 428/532; 427/154; 427/155
[58] Field of Search ...................... 524/35, 37, 38, 39, 524/40, 41, 42, 43, 44, 45, 46; 428/507, 532; 427/154, 155; 264/130, 300, 304

[56] References Cited

U.S. PATENT DOCUMENTS

| | | | |
|---|---|---|---|
| 3,583,932 | 6/1971 | Benton et al. | 427/155 |
| 3,690,909 | 9/1972 | Finley | 427/155 |
| 4,077,932 | 3/1978 | Columbus | 524/114 |
| 4,304,815 | 12/1981 | Cugasi, Jr. | 428/331 |

*Primary Examiner*—John Kight, III
*Assistant Examiner*—Nathan M. Nutter
*Attorney, Agent, or Firm*—Wallenstein, Wagner, Hattis, Strampel & Aubel

[57] ABSTRACT

Differential release coating compositions for use on liners of the type employed in the manufacture of pressure sensitive adhesive backed label transfer tape in roll form. The compositions in their preferred form comprise a binder, an aqueous solution of an organopolysiloxane, a catalyst, and an acrylic acid-acrylonitrile terpolymer.

4 Claims, No Drawings

RELEASE COATING COMPOSITIONS

The present invention relates to differential release coating compositions for use in connection with rolled pressure sensitive label transfer tape liners.

Heretofore, manufacturers of rolled pressure sensitive label transfer tapes have generally employed one of two techniques in the preparation of the final labeling product. One technique used involves the steps of coating the pressure sensitive adhesive onto a Kraft paper liner, and subsequently transferring the adhesive onto a polyethylene coated liner. The obvious disadvantage in utilizing this technique is that the initial Kraft liner on which the adhesive is cast is discarded after the adhesive has been transferred. The other technique commonly used by manufacturers is to cast the adhesive onto the organic solvent based silicone coated side of a differential release coated polyethylene impregnated Kraft liner. A differential release coated liner has a release coating on each side of the liner, the release coatings being characterized in that the coating on one side has a specific release value which is different from that of the coating on the opposite side of the liner. Normally, the release coating with the lower release value is on the back or matte side of the liner, while the coating with the higher release value, sometimes referred to as the controlled release coating, is on the shiny or gloss side of the liner. Organic solvent based silicone coated liners have a relatively short shelf life due to the fact that equalization of the release values of each of the coatings takes place with the result that confusion of the pressure sensitive adhesive occurs during unwinding of the tape.

Water based silicone coatings, when applied to paper, do not change their release values when maintained in roll form, and such emulsions can be applied to the matte side of polyethylene coated substrates. However, so far as can be determined, a satisfactory differential or higher release coating has not heretofore been applied to the reverse, or shiny side, of such a substrate. One of the most vexing problems which has been encountered in prior attempts to provide such coatings has been smearing, or pick-off, of the coating on the rollers during processng with the result that detackification of the pressure sensitive adhesive takes place. The resulting product is useless when wound into a roll.

In accordance with the present invention, differential release coating compositions have been evolved which enable the production of differential release coated liners having superior properties. The coating compositions of this invention retain their high release values for prolonged periods, and do not, when applied to the reverse or shiny side of a liner material, experience any equalization of their release values with a coating having a lower release value on the back or matte side of the liner material. As a result, pressure sensitive adhesive backed label transfer tapes utilizing liners coated with the compositions of this invention have an appreciably longer shelf life even when stored under widely varying conditions of temperature and humidity. In addition, the compositions of the present invention, unlike prior release coating compositions, can be applied to a liner material with conventional equipment without encountering any smearing, or pick-off, of the coating on the rollers.

The release coating compositions, in brief, comprise as essential active ingredients a binder, a silicone compound, and a terpolymer, especially a terpolymer formed of monomers selected from the group consisting of ethylenically unsaturated aliphatic monocarboxylic acids, and esters of such acids, and mixtures thereof. The terpolymer, in a preferred form, comprises a polymer of an ethylenically unsaturated aliphatic monocarboxylic acid, an ethylenically unsaturated aliphatic nitrile, and at least two esters of ethylenically unsaturated aliphatic monocarboxylic acids.

The release coating compositions advantageously are applied to a substrate, such as a liner material, in the form of an aqueous solution wherein water comprises the major proportion of the coating composition. The binder used desirably is water soluble. The silicone compound preferably comprises an aqueous emulsion of an organopolysiloxane. A catalyst is employed as a curing or cross-linking agent for the silicone compound. Additives such as a wetting agent may be incorporated into the aqueous solution to improve distribution of the solution on the substrate material.

As indicated, the binders employed in the compositions desirably are water soluble. Preferred binders are water soluble cellulosics exemplified by methyl cellulose, hydroxyethyl cellulose, ethyl cellulose, carboxymethyl cellulose, and hydroxypropyl methyl cellulose. Of the foregoing, hydroxyethyl cellulose is especially preferred.

The organopolysiloxane emulsion utilized in the formulation of the compositions can be selected from a number of commercially available products. Aqueous emulsions of this type generally have a solids content ranging from about 30% to about 60%, usually about 40% to about 50%. An especially preferred product is the aqueous dimethylpolysiloxane emulsion sold under the trade designation "SYL-OFF 22" (Dow-Corning). Exemplary of other organosiloxane emulsions which can be used are those sold under the designations "ARSIL 302-E" (Arjay); "SM-2061" (General Electric); and "L-7002" (Union Carbide).

The catalysts employed to initiate curing or cross-linking of the organopolysiloxane also are available commercially. Included in this group are metal salts of organic acids exemplified by tin octoate, zinc octoate, tin butyrate, and dibutyl tin diacetate, to mention a few. A preferred catalyst comprises a mixture of zinc octylate and dibutyl tin diacetate sold under the trade designation "SYL-OFF 1171-A" (Dow-Corning).

Exemplary of polymerizable monomers comprising the terpolymer employed in the compositions are ethylenically unsaturated aliphatic monocarboxylic acids such as acrylic acid, methacrylic acid, crotonic acid and isocrotonic acid. Also useful as polymerizable monomers in forming the terpolymer are esters of the aforementioned ethylenically unsaturated aliphatic monocarboxylic acids. Included in this group are methyl acrylate, ethyl acrylate, n-propyl acrylate, ethyl methacrylate, cyclohexyl acrylate, and 2-ethylhexyl acrylate. In addition to the foregoing, other monomers which can be used include ethylenically unsaturated aliphatic nitriles such as acrylonitrile, methacrylonitrile, ethylacrylonitrile, and the like. A preferred terpolymer is the commercially available product sold under the designation "E-358" (Rohm & Haas). This product comprises approximately 1% acrylic acid, 15% acrylonitrile, 34% 2-ethylhexylacrylate and 50% ethylacrylate.

Wetting agents having utility in the practice of the present invention can be selected from a wide group. Specific examples of wetting agents are the octylphenoxy-polyethoxy ethanol sold under the designation "Triton X-100" (Rohm & Haas), and the ethoxylated alkyl phenols available under the designation "TEX-WET 1155" (INTEX).

In formulating the compositions preparatory to applying them to a substrate material, water will comprise the major proportion, usually about 60 to about 90, preferably about 70 to about 80 parts by weight, of the aqueous medium. The binder will usually comprise about 2 to about 10, preferably about 4 to about 6 parts by weight of the aqueous medium. The proportion of organopolysiloxane emulsion used in formulating the compositions can range from about 5 to about 15, usually about 8 to about 12 parts by weight of the total weight of the aqueous medium. The catalyst utilized can vary from about 1 to about 5, usually about 2 to about 3, parts by weight of the medium. The amount of terpolymer used in formulating the compositions wil be about 2 to about 16, preferably about 8 to about 12 parts by weight.

The substrate materials on which the compositions are applied may be any material used as a liner in the making of pressure sensitive label transfer tapes. An especially preferred substrate material for use with the compositions of this invention is a polyethylene coated Kraft paper. Such a paper has a back, or matte side on which a release coating, having one release value, is applied, and a front, or shiny side on which a release coating having a higher release value is applied. The compositions of the present invention provide coatings having higher release values, and, therefore, are applied to the front, or shiny side of the polyethylene coated liner.

The release coating applied to the back or matte side of the liner desirably also comprises a binder, and an organopolysiloxane emulsion. The binder and the emulsion may be the same as those used in formulating the release coating compositions of the present invention. However, the proportions of binder and silicone emulsion differ from the proportions of those components utilized in formulating the release coating compositions of this invention. Thus, a typical release coating composition for application to the back or matte side of a liner will comprise about 70 to about 90, preferably 75 to about 85, parts by weight of binder. The amount of organopolysiloxane emulsion used will be of the order of about 5 to about 20, usually about 10 to about 15 parts by weight. A small amount, about 0.1 to about 1, preferably about 0.3 to about 0.5 parts by weight of an extender such as acetic acid advantageously is added to the composition.

The coating compositions of this invention can be applied to a substrate such as a polyethylene coated Kraft paper liner with standard equipment. While the composition may be applied to the substrate by spraying, or by means of rollers, it is preferred to use a Meyer rod. Both sides of a liner can be coated. simultaneously, that is, a composition of this invention can be applied to the front of shiny side of the liner while at the same time a release coating composition comprising a binder and an organopolysiloxane emulsion can be applied to the reverse or back side of the liner. The amount of the coating compositions applied to each side will be of the order of about 1 to about 2, preferably about 1.5 pounds per ream of substrate material.

The following example is illustrative of the best embodiment of the present invention. The ingredients of the compositions are shown in parts by weight.

EXAMPLE

The following release coating compositions were formulated by simple mixing:

| Composition 1 | |
|---|---|
| Ingredient | Parts |
| Composition 1 | |
| Water | 76.7 |
| Hydroxyethyl cellulose | 4.2 |
| Wetting agent (Triton X-100) | 0.1 |
| Terpolymer (E-358; Rohm & Haas) | 6.0 |
| Organopolysiloxane emulsion (SYL-OFF 22) | 12.0 |
| Catalyst (SYL-OFF 1171-A) | 2.5 |
| Composition 2 | |
| Hydroxyethyl cellulose | 81.0 |
| Organopolysiloxane emulsion (SYL-OFF 22) | 12.0 |
| Catalyst (SYL-OFF 1171A) | 2.5 |
| Extender (acetic acid) | 0.3 |

The compositions were applied by machine to the front and back sides of a polyethylene coated Kraft paper under the following conditions, Composition 1 being applid to the front or shiny side of the paper, and Composition 2 being applied to the back or matte side of the paper:

| | |
|---|---|
| Oven temperature | 240° F. |
| Web temperature | 230–235° F. |
| Rod size | #10 |
| Applicator speed | 2.5 feet/min. |
| Line speed | 80–120 feet/min. |
| Amount of coating | 1.5 lbs/ream |

The release or peel values of each of the coatings was determined utilizing a Keil Tester (Dow-Corning) following test procedure RC 283 as prescribed by the Technical Association of the Pulp and Paper Industry.

The release value for the coating formed with Composition 1 was 60. The release value of the coating formed with Composition 2 was 30. These values indicate that the coated paper has excellent differential release coating properties.

We claim:

1. A differential release coated sustrate for use as a liner for pressure sensitive adhesive label transfer tapes in roll form, comprising: a plastic coated substrate material having a matte side and a gloss side, the matte side of the substrate having a differential release coating thereon formed of a composition consisting essentially of a major proportion of a water soluble cellulosic substance, a minor porportion of an organopolysiloxane and a curing agent for the organopolysiloxane, the gloss side of the substrate having a differential release coating thereon formed from a composition consisting essentially of a major proportion of water, and a minor proportion, each, of a water soluble cellulosic substance, an organopolysiloxane, a curing agent for the organopolysiloxane, and a terpolymer formed of acrylic acid, acrylonitrile and esters of a substituted acrylic acid, the release coating on the gloss side of the substrate having a higher release value than the release coating on the matte side of the substrate, the differential release coatings being characterized in that they do not undergo any appreciable change in their respective release values during prolonged storage.

2. A substrate according to claim 1 wherein the amount of the release coatings on the substrate surfaces is of the order of about 1 to about 2 pounds per ream of substrate material.

3. A release coated substrate according to claim 1 wherein the water soluble cellulosic substance is hydroxyethylcellulose.

4. A release coated substrate according to claim 1 wherein the terpolymer comprises about 1% acrylic acid, about 15% acrylonitrile, about 34% ethylhexylacrylate and about 50% ethylacrylate.

* * * * *